May 3, 1960

C. J. GARDEEN 2,935,620

EXCITATION INDICATOR FOR GENERATORS

Filed March 26, 1958

INVENTOR
CARL J. GARDEEN
By Chas. C. Reif
ATTORNEY.

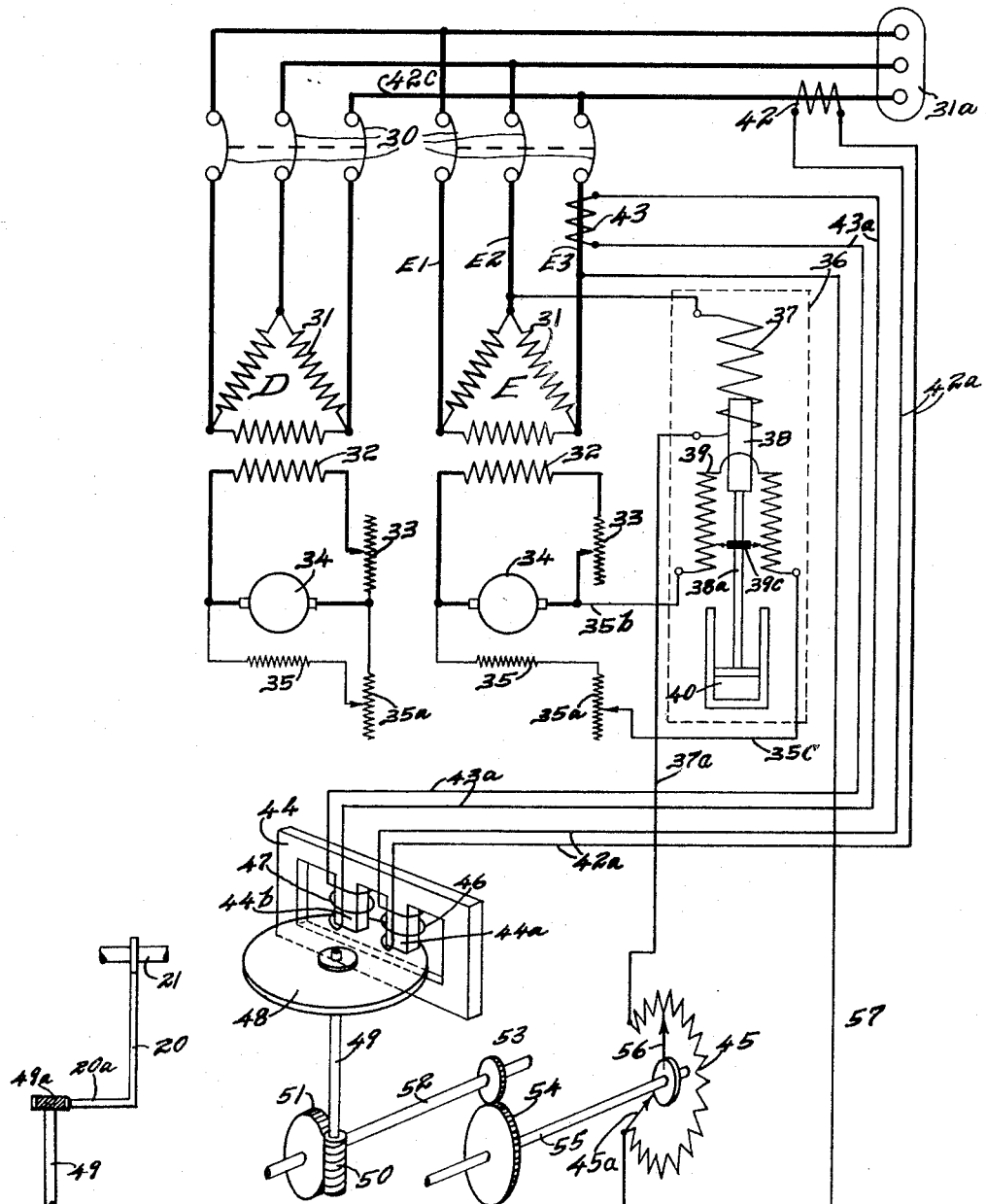

United States Patent Office 2,935,620
Patented May 3, 1960

2,935,620

EXCITATION INDICATOR FOR GENERATORS

Carl J. Gardeen, St. Paul, Minn.

Application March 26, 1958, Serial No. 724,210

3 Claims. (Cl. 307—57)

This invention relates to an electrical device for controlling the proper operation of two or more alternating current generators operating in parallel or of one alternating current generator operating in parallel with a second alternating current source.

When alternating current generators are operated in parallel it is usually desirable to adjust the field excitation of each generator so as to cause all the said generators to operate at equal power factors so that all wasteful cross currents between the several generators will be eliminated. The power factor varies with the lag or load of the current in respect to the voltage. The power factor is equal to or proportional to the cosine of the angle between the current and voltage. When generators are operating in parallel at equal power factors, the power factor of the load on each generator is equal to the power factor of the total load on said generators and the power factor of the load on any one of the said generators is equal to the power factor of the load on the remaining generators. When alternating current generators are operated in parallel it is usually desirable and customary to adjust the field excitation of each generator so as to cause all of the generators to operate at equal power factors thereby eliminating wasteful cross currents between said generators.

It is an object of this invention to provide a device to be used with two or more single phase or polyphase alternating current generators operating in parallel or with one or more alternating current sources and one alternating current generator operating in parallel with a second alternating current source comprising means for varying the excitation of the fields of said generators, a movable conducting member, means for producing a magnetic flux by the current in one phase of one of said generators, which flux is adapted to traverse said member, means for producing a second magnetic flux by the total current in the said phase of said generators or by the current in the said phase of the said second source, said second flux being adapted to traverse said member so that if said currents producing said fluxes are out of phase said member will be moved by said fluxes and said member can be used to indicate low or high excitation of the field of said generator or can be used to adjust the excitation of the field of said generator.

It is another object of this invention to provide a device to be used with two or more alternating current generators connected to operate in parallel comprising means for varying the excitation of the fields of said generators respectively, a movable conducting member, means for producing a magnetic flux by the current in one phase of one of said generators, means for producing a second magnetic flux by the current in said phase of the total load of said generators, said second flux being adapted to traverse said member, said fluxes being arranged so that said member will be moved if the currents producing said fluxes are out of phase.

It is a further object of this invention to provide such a device as set forth in the preceding paragraph together with means actuated by movement of said member for operating an indicator indicating the excitation of said generator or with means actuated by movement of said member for varying the excitation of the field of said generator.

It is also an object of this invention to provide a device to be used with two or more alternating current generators connected to operate in parallel, comprising a movable conducting member for each of said generators, means for producing magnetic fluxes by the currents respectively in one phase of the said generators, which fluxes are adapted respectively to traverse said members and means for producing a second magnetic flux by the current in said phase of the total load of said generators, which second flux is adapted to traverse said members so that said members will respectively be moved if said currents producing said fluxes are out of phase.

It is a further object of this invention to provide a device such as set forth in the preceding paragraph, together with means operated by one or more of said movable conducting members for adjusting said generators respectively for bringing said currents into phase so that said generators will operate at equal power factors.

These and other objects and advantages of the invention will be fully set forth in the following description made in connection with the accompanying drawings in which like reference characters refer to similar parts throughout the several views and in which.

Figures 1, 2:
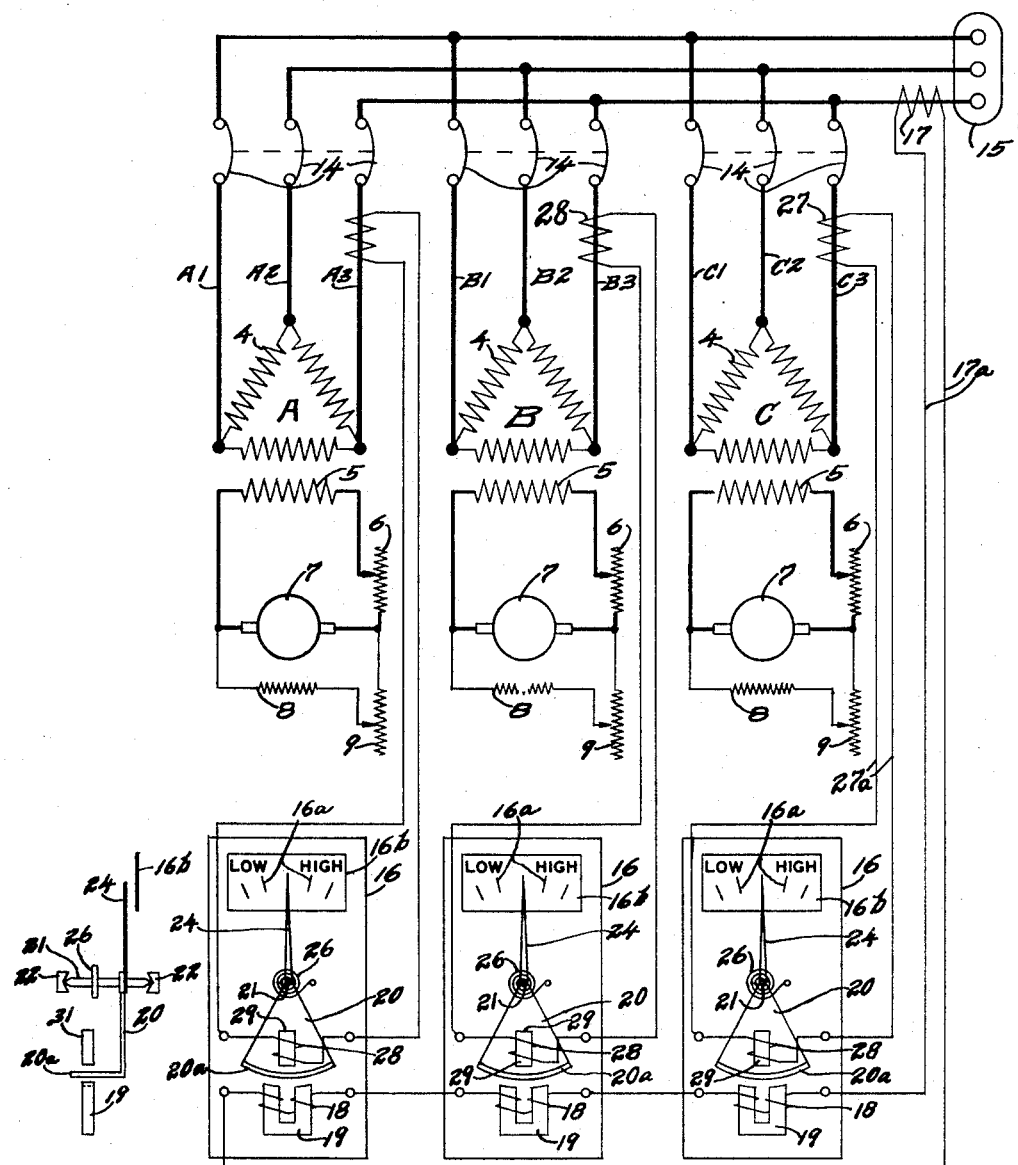
Fig. 1 is a diagrammatic view illustrating three three-phase alternating current generators connected to operate in parallel to supply a load together with connections to three electro-magnetically movable members arranged to operate indicators.
Fig. 2 is a diagrammatic view in side elevation of part of Fig. 1.

Fig. 3 is a diagrammatic view illustrating two three-phase alternating current generators operating in parallel to supply a load together with a voltage regulator and connections to an electro-magnetically movable member arranged automatically to operate in connection with said voltage regulator to vary the excitation of said generators; and Fig. 4 is a partial view similar to Fig. 2 showing a modification.

Referring to the drawings, particularly Figs. 1 and 2, three three-phase alternating current generators A, B and C are shown. These generators are identical and each comprises a stator winding 4, a revolving field winding 5, a generator field rheostat 6, an exciter armature 7, an exciter field 8, an exciter field rheostat 9 and a circuit breaker 14. As is well known, such a generator has an exciter and the excitation of the generator is varied by changing the resistance of the generator field rheostat 6 or of the exciter field rheostat 9 or both. This may be done manually or it may be done automatically as when an automatic generator voltage regulator is used. The generators are shown as having the three-phases A1, A2 and A3, B1, B2 and B3, and C1, C2 and C3, and said generators supply a load 15.

As shown in Fig. 1, three instruments 16 are shown, one for each of generators A, B and C, said instruments being identical. A current transformer 17 is connected in one phase of the load line, namely the phase corresponding to phase A3, B3 and C3. The primary of the transformer 17 is connected in the same phase which carries the total load on phase A3, B3 and C3 of said generators. The secondary of the transformer 17 is connected by conductors 17a in series with a coil 18 formed on a core 19 shown as having two arms, there being three of the cores 19, one on each instrument 16. Three movable conducting members 20 are shown as in the form of sectors and each is oscillatable about the axis of a shaft 21. Shaft 21 is carried in suitable bearings 22 in which it is rotatable and a pointer 24 is connected to member 20 which is in turn connected to shaft 21. A spiral torsion spring 26 is secured at one end to shaft 21 and at its other end to a stationary point on instrument 16, said spring holding pointer 24 normally aligned with the center one of a series of indications 16a on a scale 16b. As shown in Fig. 1, the indications 16a at the left are designated "low" and those at the right are designated "high." Another current transformer 27 is connected in the third phase A3, B3 and C3 of each generator. The primary of each transformer 27 is connected in said third phase and the secondary of each transformer 27 is connected by conductors 27a to a coil 28 on a core 29 of each of the instruments 16. As shown in Figs. 1 and 2, each member 20 has a portion 20a disposed between the cores 19 and 29.

The cores 19 and 29 are arranged so that when currents which are in phase pass through coils 18 and 28 no torque will be exerted on member 20. It will be seen that the flux from cores 19 and 29 will pass through member 20 and its portion 20a so that a torque can be exerted on member 20 by said flux. When the currents passing through coils 18 and 28 differ in phase, said flux will exert a torque on member 20 and said member and pointer 24 will move about the axis of shaft 20 so that pointer 24 is moved from its normal central position. The direction in which the member 20 and pointer 24 are moved will depend upon whether coil 28 carries the leading current with respect to coil 18 or whether coil 18 carries the leading current relative to coil 28. The magnitude of the movement of the member 20 will be approximately proportional to the product of the currents through coils 18 and 28 and the sine of the phase angle between the currents passing through said coils.

It will thus be seen that when generator A is operating at the same power factor as that of the total load passing through transformer 17, the currents passing through coils 28 and 18 will be in phase and no torque will be exerted on member 20 and the pointer 24 will remain in its normal central position. This will indicate that the relative excitation of the generator is correct. When, however, the generator A is operating in parallel with one or more of generators B and C and the excitation of the generator A is such that the power factor at which generator A is operating is different from the power factor of the total load, then the currents passing through coils 28 and 18 will differ in phase and a torque will be exerted on member 20 by the flux and this will move member 20 and pointer 24 in one direction or the other, depending upon whether the current through coil 28 is leading or lagging as compared with the current passing through coil 18. This in turn will depend upon whether the generator A is under or over excited. When the generator is under excited the pointer is moved to the left indicating low excitation and when the generator is over excited the pointer is moved to the right indicating high excitation. The above description applies to all of the generators and all of the instruments 16. The remarks about the low and high excitation would apply just the same for generators B and C.

From the above description it will also be seen that the structure shown and described moves the member 20. In the embodiment of the invention shown in Fig. 1, the movement of member 20 is utilized to form an indicator. With the structure shown in Fig. 1, the operator has to observe the three instruments 16 and he can see at once if one of the generators is over-excited or whether it is under-excited or in other words, if the excitation is low or high. He can then make the necessary adjustments to bring the power factors into the desired relations.

In Fig. 3 the movement of the movable conducting member is utilized to automatically correct the excitation of the generators. In Fig. 3 two three-phase alternating current generators D and E are shown. Each generator is shown as having a circuit breaker 30, a stator winding 31, a revolving field winding 32, a generator field rheostat 33, an exciter armature 34, an exciter field 35 and an exciter field rheostat 35a. Said generators supply a load 31a. An individual type rheostatic alternating current generator voltage regulator designated generally as 36 is shown connected to generator E. Such a voltage regulator is now well known in the art. Said regulator comprises a two arm resistance 39 which is connected in series with exciter field 35 by conductors 35b and 35c. The effective resistance value of the resistance 39 is varied by the slider member 39c shown as connected to the stem 38a of the core 38 movable in a coil 37. Slider 39c is in electrical contact with both arms of resistance 39. The coil 37 is energized by being connected to one phase of generator E, the voltage of which is to be regulated. High voltage would tend to move core 38 upwardly in coil 37, while low voltage would permit said core to drop by gravity. A dash pot 40 is provided for stem 38a and core 38 for stabilizing the action of the regulator. The high voltage as stated, moves core 38 upwardly and this increases the resistance in the exciter field circuit and lowers the exciter and alternating current generator voltage. Low voltage as stated, allows core 38 to move downwardly by gravity, thus moving slider 39c downwardly and this decreases the resistance in the exciter field circuit and increases the exciter and alternating current generator voltage. In practice, the regulator acts to maintain a balance between the attraction of coil 37 in one direction and gravity acting in the opposite direction. In maintaining this balance the output voltage to the generator E is automatically maintained constant. Coil 37 is connected by conductor 37a to the voltage adjusting resistance or rheostat 45 which is in series with coil 37 and is illustrated as circular.

In accordance with the present invention a current transformer 42 is connected in one phase of the load line of generators D and E. The primary of the transformer 42 is connected with said phase. The secondary of the transformer 42 is connected by conductors 42a to coil 46 on core 44 which is illustrated as generally in the form of a rectangle having an open rectangular center or air space. Said core has salient depending pole pieces 44a and 44b and conductors 42a connect to a coil 46 on pole piece 44a. A current transformer 43 is connected in one phase, namely phase E3 of generator E. Transformer 43 is connected with the same phase of the generator E that transformer 42 is connected to in said load line. The primary of the transformer 43 is connected in said phase E3 and the secondary of the said transformer 43 is connected by conductors 43a to a coil 47 formed on pole piece 44b. A disc 48 is provided carried on a shaft 49, which disc extends into the air space of core 44 and between said core and the ends of the pole pieces 44a and 44b. Shaft 49 has connected thereto a worm gear 50 which meshes with a worm wheel gear 51 secured to a shaft 52. A gear 53 is secured to shaft 52 and meshes with a gear 54 secured to a shaft 55. Shaft 55 has secured thereto an arm 56 movable over and contacting resistance member 45. One end 45a of resistance 45 is electrically connected to arm 56 and is also connected by a conductor 57 to phase E3 of generator E.

As stated, in the structure shown in Fig. 3, the flux produced by coils 46 and 47 passes through the member 48. If the currents in coils 46 and 47 are in phase there will be no torque exerted by the flux to move disk 48. However, if the said currents are not in phase the flux will move disk 48 and it will be rotated to rotate shaft 49. The direction of rotation of disk 48 will depend upon whether coil 46 or coil 47 carries the leading current as compared with the other coil. It will be seen that the primary of transformer 43 is connected in phase E3 of generator E. The primary of transformer 42 is connected in the same phase but so as to carry the total load current on phase 3 of both generators D and E. Therefore when generator E is operating at the same power factor as that of the total load passing through transformer 42 the currents passing through coils 46 and 47 are in phase and no torque is exerted on disk 48. When however generator E is operating in parallel with generator D and the excitation of generator E is such that the power factor at which generator E is operating is different from the power factor of the total load, then the currents passing through coils 46 and 47 are out of the phase or differ in phase angle and the disk 18 is caused to rotate in one direction or the other depending as above stated, upon whether the current through coil 46 is leading or lagging as compared with the current passing through coil 46. This in turn will depend upon whether generator E is under or over-excited. As stated, the resistance or rheostat is connected in series with coil 37 of the voltage regulator. In accordance with the action of the voltage regulator, increasing the resistance of the rheostat 45 causes the excitation of generator E to increase. Inversely decreasing the resistance of rheostat 45 has the effect of lowering or reducing the excitation of generator E. Shaft 49 drives shaft 52 through gears 50 and 51 and shaft 52 drives shaft 55 through gears 53 and 54. Shaft 55 will move arm 56 which will cut in or cut out resistance in the circuit of conductors 57 and 37a, which circuit includes coil 37. If disk 48 is moved in a clockwise direction resistance will be cut into said circuit and the excitation of generator E will be increased. If disk 48 moves in a counter-clockwise direction resistance will be cut out of said circuit and the excitation of generator E will be lowered. The polarity of the conductors to coils 46 and 47 is thus such that when generator E is under-excited the disk 48 will be driven in a direction which will move arm 56 to increase the resistance in the circuit of conductors 57 and 37a and coil 37 thereby causing the excitation of generator E to be increased until the power factor of the currents passing through coils 46 and 47 are equal. Disk 48 will then come to rest. Conversely when generator E is over-excited the disk 48 will be moved to decrease the resistance in said circuit and the excitation of generator E will be decreased until the power factor of the currents passing through coils 46 and 47 are again equal and disk 48 will then come to rest.

In the embodiment of the invention shown in Fig. 3 therefore, the movable conducting member 48 which corresponds to one of the movable members 20 shown in Fig. 1 is used for automatically maintaining correct relative excitation of generators D and E operating in parallel. The correct line voltage is maintained by generator D through the use of an alternating current generator voltage regulator or by other means not shown. In Fig. 3 the movable member 48 is shown as a disk. If desired, the same arrangement of coils and their cores could be used, as shown in Fig. 1. The edge of portion 20a could be provided with gear teeth, as shown in Fig. 4, so that shaft 49 could be driven through gear 49a which would be moved by member 20. Referring to Fig. 3, the current component added to the total current through transformer 42 by the current from generator E does not affect the torque exerted on disk 48 because the said current component is always in phase with the current passing through transformer 43 and coil 47. Therefore the transformer 42 can equally well be located in the circuit at 42c thus omitting the said current component from passing through transformer 42 and coil 47.

From the above description it will be seen that I have provided a simple and yet very efficient structure which could be used as shown in Figs. 1 and 2 to give an indication of the excitation of generators operating in parallel or which can be used as shown in Fig. 3, not only to give an indication of the excitation of the generators but to automatically correct the excitation so that said generators operating in parallel will operate at equal power factors. The structure is quite simple and can be easily installed in connection with the generators. The device has been amply demonstrated in actual practice, found to be very successful and efficient and is being commercially made. The invention constitutes quite an advance in the art and will have a high degree of utility in power plants where several generators are used in operating in parallel.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. An indicating apparatus for a plurality of alternating current generators for sensing an out of phase condition of the current thereof having in combination, a rotatable pointer for each of said generators, a member for each of said pointers having indicia thereon indicating high and low excitation, said pointer normally being in a central position between said high and low indications, a core of magnetic metal at one side of said pointer, a second core of magnetic metal at the opposite side of said pointer, a transformer having its primary connected in the same phase which carries the total load of said generators, a conductor wound about said first mentioned core and connected to the secondary of said transformer, a second transformer having its primary connected to the same phase of one of said generators, a second conductor wound about said second mentioned core and connected to the secondary of said second transformer whereby when the currents in said conductors are in phase, said pointer will be maintained in its central position, but if the currents in said conductors are not in phase the flux in said conductors and cores will move said pointer to indicate whether a high or low excitation is present in said generator.

2. A device of the class described having in combination, two or more alternating current generators connected in parallel, a circuit comprising said generators with each of said generators having a circuit breaker, a stator winder, a revolving field winding, a generator field rheostat, an exciter armature, and exciter field, an exciter field rheostat, and a current transformer having its primary connected in one phase to the load line of said generators, a core, the secondary of said transformer forming a coil about said core, a current transformer having its primary connected with the same phase of one of said generators as said first mentioned transformer is to the load line of said generators, a core, the secondary of said second transformer forming a coil about said second core, a voltage regulator connected in series with said exciter field, a disc disposed between said cores, a rotatably mounted arm, said disc being operatively connected to said arm to rotate the same, a resistance member in circuit with said voltage regulator and said one of said generators, said arm being connected to said resistance member whereby if the current from said one of said generators is not in phase with the current of the total load of all of said generators, said disc will be moved by the torque of the flux between said cores and will move said arm to adjust said resistance member to affect the excitation of said generator to put the current thereof in phase with the total current.

3. A device of the class described having in combination, two or more alternating current generators connected in parallel, a circuit comprising said generators with each of said generators having an exciter field, a voltage regulator connected in series with said exciter field, and a resistance member, a current transformer having its primary connected in one phase to the total load line of said generators, a core, the secondary of said transformer forming a coil about said core, a current transformer having its primary connected with the same phase of one of said generators as said first transformer is to the total load of said generators, a core, the secondary of said second transformer forming a coil about said second core, a disc disposed between said cores, a rotatably mounted arm, said disc being operatively connected to said arm to rotate the same, a resistance member in circuit with said voltage regulator and said one of said generators, said arm being connected to said resistance member whereby if the current of said one of said generators is not in phase with the current of the total load, said disc will be moved by the torque of the flux between said cores and will move said arm to adjust said resistance member to affect said one of said generators to put the current of the same in phase with the current of the total load.

References Cited in the file of this patent

UNITED STATES PATENTS

| | | |
|---|---|---|
| 928,219 | Rose | July 13, 1909 |
| 2,158,880 | Mathews | May 16, 1939 |
| 2,840,723 | Brown | June 24, 1958 |